June 12, 1962 R. T. FUJIOKA 3,038,208
METHOD AND APPARATUS FOR SHAPING BAND PLASTIC SHEETING
Filed Dec. 3, 1959 3 Sheets-Sheet 1
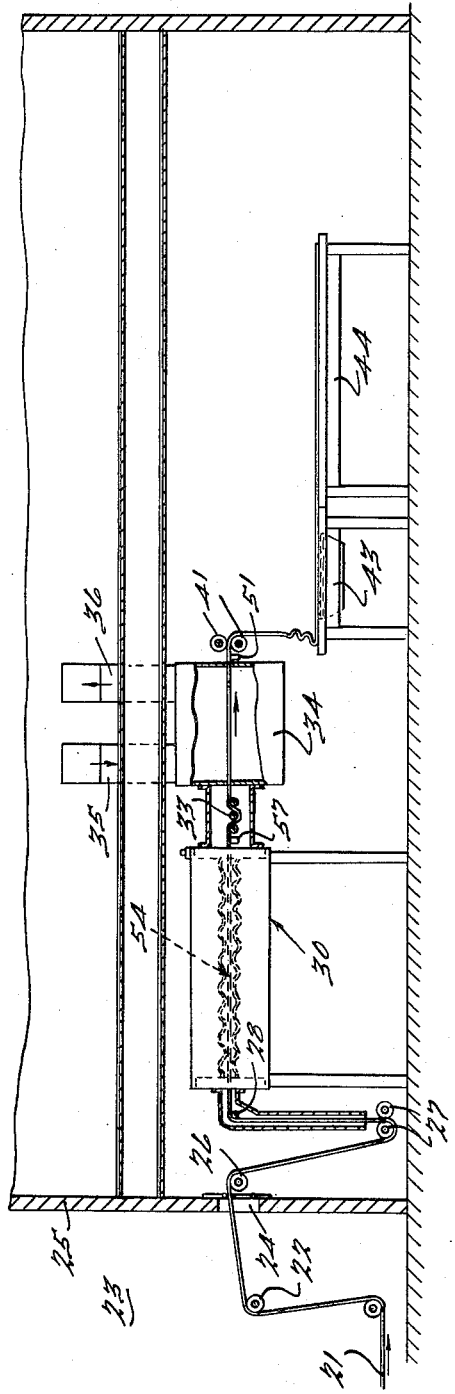
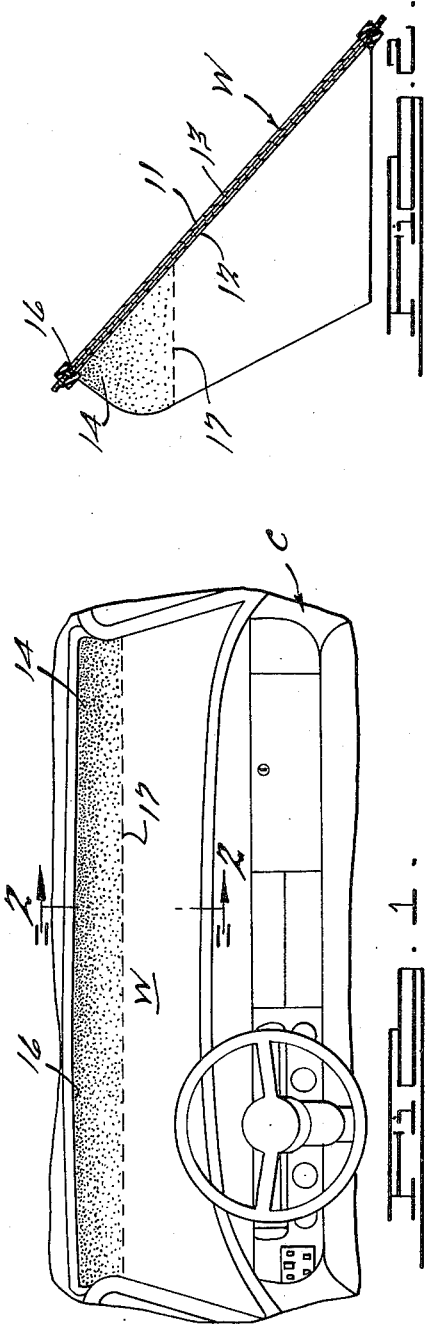
INVENTOR.
Richard T. Fujioka.
BY
Harness and Harris
ATTORNEYS.

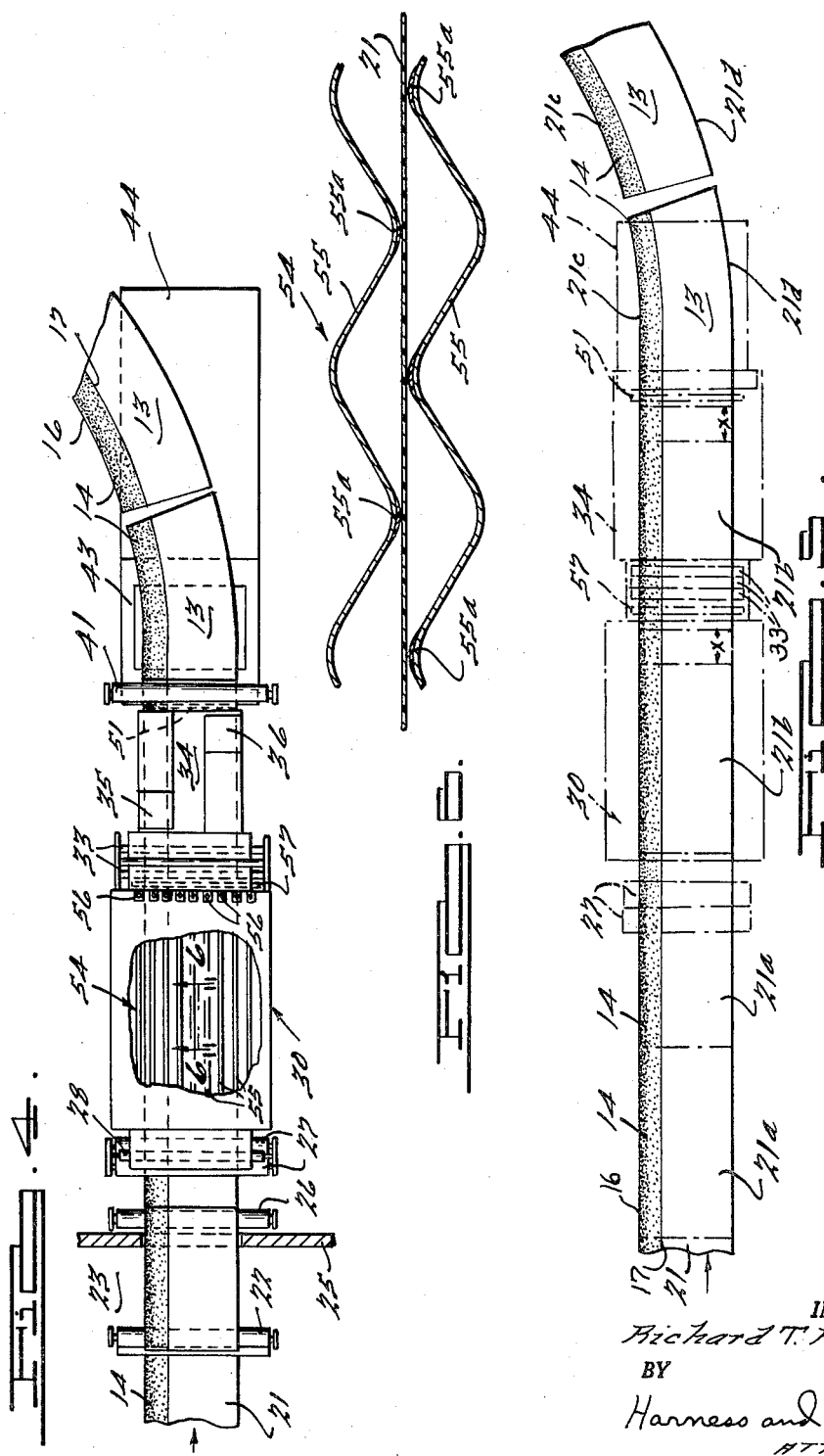

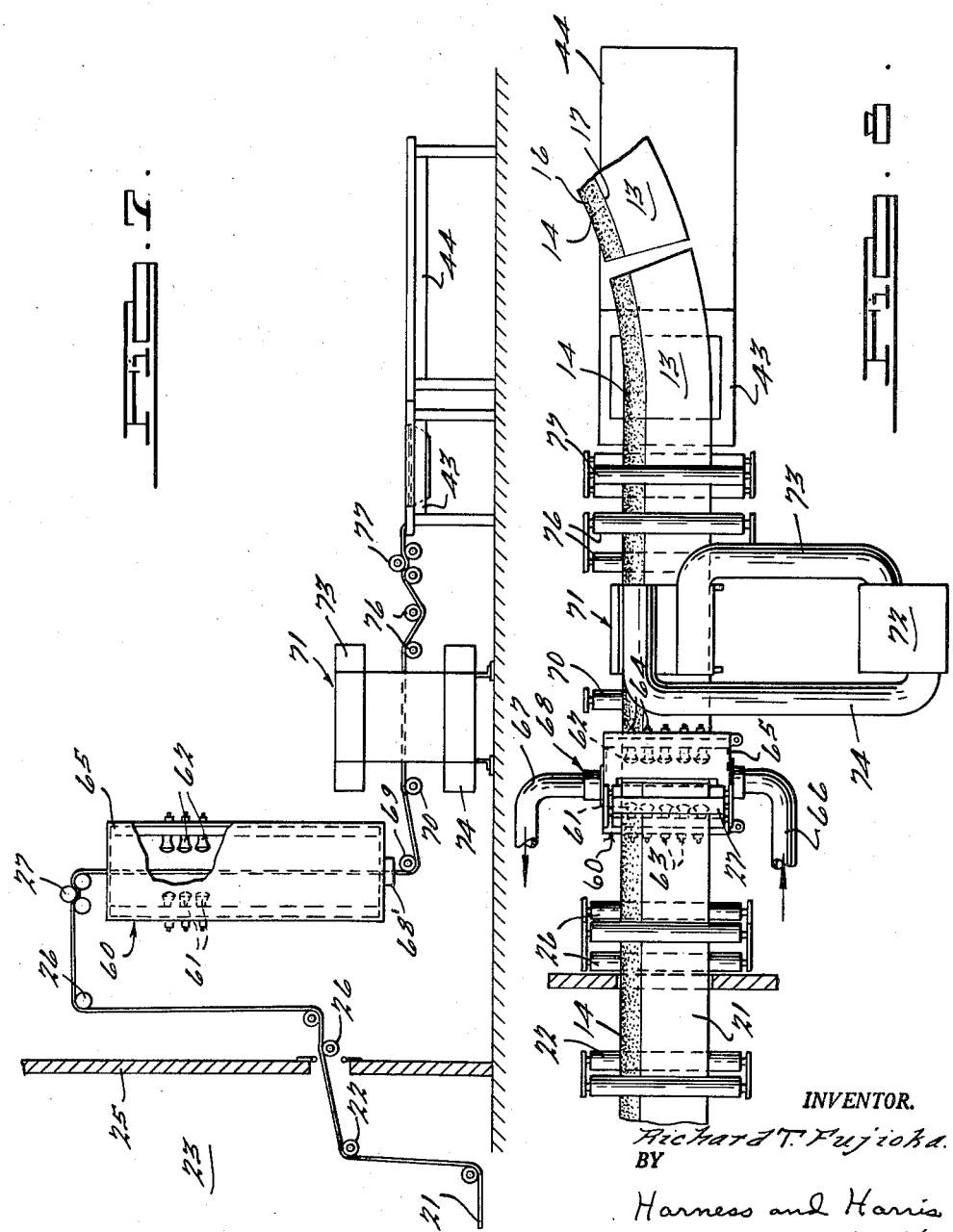

United States Patent Office 3,038,208
Patented June 12, 1962

3,038,208
METHOD AND APPARATUS FOR SHAPING BAND PLASTIC SHEETING
Richard T. Fujioka, Oxford, Mich., assignor to Chrysler Corporation, Highland Park, Mich., a corporation of Delaware
Filed Dec. 3, 1959, Ser. No. 857,020
11 Claims. (Cl. 18—48)

This invention relates to colored plastic interlayer sheeting adapted for glare shields or glare screens in laminated glass panels such as motor vehicle windshields. This invention is particularly concerned with the method of manufacture of such colored interlayer sheeting and the apparatus utilized to accomplish this method of manufacture.

In current motor vehicles the body styling is such that the windshields usually consist of a single large panel of laminated glass that extends in an arc across the upper front end portion of the vehicle body and is inclined upwardly and backwardly at a substantial angle to the vertical. In many cases these windshields also include sharply bent, rearwardly projecting, end portions that sometimes also project downwardly to provide what is commonly termed the "wrap-around" type of windshield. Because of the large expanse of glass positioned in front of the vehicle operator it has been found advantageous to tint or color the upper portion of the windshield panel with a dark color such as blue or green or brown to provide a glare shield or glare screen. Such glare screens or shields are usually of graduated or varying degrees of shading being relatively dark at the upper edge of the windshield panel and gradually decreasing in intensity to a perfectly clear untinted glass within approximately the upper one-third (⅓) of the windshield height.

In order to meet with certain statutory safety provisions requiring relatively constant color shading across any one horizontal plane through the tinted portion of the windshield and to also present a windshield having a pleasing appearance, it has been the desire of the windshield manufacturers to have a horizontal cut-off line between the tinted and untinted portion of the windshield and to also have the tinting increase in intensity along horizontal planes from a minimum at the cut-off line to a maximum at the upper edge of the windshield.

In order to provide a tinted band at the top edge of the plastic interlayer sheet which, when bonded between the pair of glass sheets of a conventional windshield panel, will present a substantially horizontal cut-off line between the tinted and untinted portions of the windshield and also have the color or tint intensity in any one horizontal plane substantially uniform across said one plane, it has been found necessary to stretch the previously tinted plastic sheeting to an arcuate form prior to laminating the plastic between the pair of glass panels that make up a conventional laminated glass windshield. This invention concerns the method and apparatus for stretching tinted plastic sheeting into an arcuate shape such that the stretched sheeting can then be cut into sections and placed between previously bent glass panels with the tinted plastic giving a horizontal cut-off line between the tinted and untinted portions of the windshield and horizontal uniform tint planes.

Other objects and advantages of this invention will become readily apparent from a reading of the following description and a consideration of the related drawings wherein:

FIG. 1 is a fragmentary elevational view of the windshield mounting portion of a motor vehicle having a banded windshield formed in accordance with this invention;

FIG. 2 is an enlarged sectional elevational view of the windshield, the view being taken on the line 2—2 of FIG. 1;

FIG. 3 is a diagrammatic side elevational view, with portions broken away and partly in section, of one form of apparatus for stretching plastic sheeting in accordance with this invention;

FIG. 4 is a diagrammatic top plan elevational view, with portions broken away and in sections, of the plastic stretching apparatus shown in FIG. 3;

FIG. 5 is a schematic top plan view of the plastic stretch apparatus shown in FIG. 3, this view showing the elongation of the plastic while it is being heated between the tensioning rolls and the arcuate shaping of the plastic after release from the rolls;

FIG. 6 is an enlarged, fragmentary, sectional elevational view taken along the line 6—6 of FIG. 4 showing the details of construction of the electrode units;

FIG. 7 is a diagrammatic side elevational view, with portions broken away and in section, showing a modified form of apparatus to stretch plastic apparatus in accordance with this invention; and FIG. 8 is a diagrammatic top plan view partly in section, of the apparatus shown in FIG. 7.

FIG. 1 shows the forward portion of a motor vehicle body driver's compartment C looking from the rear of the vehicle forwardly through the banded, wrap-around, windshield W. Windshield W (see FIG. 2) is composed of a pair of bent glass panels 11 and 12 that are separated by and bonded to a plastic interlayer sheet 13. The interlayer sheet 13 has a colored or tinted band 14 extending along its upper edge portion that is of graduated intensity varying from a dark color shading at the top edge 16 to a light or clear color shading at the cut-off line 17 where the tinting is completely eliminated. As can be seen from FIGS. 1 and 2, the cut-off line 17 appears as a substantially horizontal line and the tinting increases in intensity from the cut-off line 17 to the top edge 16 with the color intensity along any one horizontal plane across the windshield W being substantially the same. In order to achieve this graduated, constant plane, tinting effect on a curved glass windshield, it is necessary to initially form the tinted interlayer 13 with an arcuately shaped color band 14 so that the band will assume such a position when mounted on the curved glass panels 11, 12 that the band cut-off line 17 and the equal intensity planes are horizontal. To arcuately shape the banded plastic interlayer 13 to properly seat on the curved glass panels 11, 12 has been achieved in the past by various types of complicated plastic stretching frames such as those shown in U.S. Patents 2,593,405, 2,700,007 and 2,873,474. Prior art practices have been slow and expensive and subject to a high degree of individual worker skill which gave variable results. This invention provides a method and apparatus for stretching the banded plastic interlayer sheeting that is fast, inexpensive, continuous and free from reliance on the capabilities or skills of the individual workers who produce the plastic interlayers.

Now looking at FIGS. 3, 4 and 5, which show one form of apparatus for stretching banded plastic in accordance with this invention it will be noted that a continuous, constant width, sheet of tinted or color banded plastic 21 is fed to and passed over the rollers 22 in a chiller room 23 and then through an opening 24 in the wall 25 to a guide roll 26. From the guide roll 26 the constant width, banded, plastic 21 is passed through the friction grip reaction rolls 27. From the reaction rolls 27 the banded plastic sheeting 21 passes upwardly around a guide roll 28 and thence through a plastic heating unit 30. The heating unit 30, which is the nucleus or the key to the invention herein disclosed, will be described in detail after the remainder of the apparatus has been described.

After passing through the heater unit 30 the heated plastic sheeting 21 is threaded through a set of anti-wrinkle rolls 33. On leaving the anti-wrinkle rolls 33 the heated plastic sheeting 21 passes through a cooling chamber 34. Cooling chamber 34 may be of the recirculating cooled air type wherein cooled air is supplied to the chamber 34 by a supply duct 35 connected to suitable refrigeration unit (not shown). The cooled air supplied to the cooling chamber 34 is passed through the chamber 34, across the heated plastic sheeting 21 and then leaves the chamber 34 by way of the return ducting 36 that directs the cooled air back to the refrigeration unit for re-cooling.

The plastic sheeting 21 that has been heated and then cooled leaves the cooling chamber 34 and passes through the friction grip tensioning rolls 41 which are arranged so that they can be driven at speeds somewhat greater than the speed of the reaction rolls 27. Variation in the speed of the tensioning rolls 41 can be achieved through pulley drives or gearing. Because of this difference in rotational speeds between the rolls 27 and 41, the plastic sheeting 21 that is held between these spaced rolls 27, 41 is stretched during the passage of the sheeting through this portion of the process. This stretching of the sheeting 21 during its passage between the rolls 27, 41 is pictorially demonstrated by FIG. 5 wherein separate sections of the sheeting 21 intended for separate interlayer units have been designated 21a as they enter the reaction rolls 27. These same sections which have been designated 21b during their passage through the portion of the process between the reaction rolls 27 and the tensioning rolls 41 are stretched an amount equal to the increment X that is clearly shown in FIG. 5. The tensioning rolls unit 41 is designed to be automatically adjustable in a horizontal plane to compensate for tendency of the plastic sheeting 21 to misalign due to a greater tension on one edge than on the other as will be more apparent from the following description. The tension rolls adjusting means will be shown and covered by a separate patent application. A sensing head control 51 is used for lateral alignment of rolls 41 in this connection.

While the plastic sheeting 21 is being stretched between the rolls 27, 41 it is also being first heated and then cooled by the heating chamber 30 and cooling chamber 34 respectively. The heating chamber 30 embodies the essence of this invention in that it is the variation in heat control across the width of the plastic sheeting 21 while it is being stretched that causes the plastic sheeting to assume a permanent arcuate shape (See panels 13 in FIG. 5) after the plastic sheeting leaves the reaction rolls 41. The theory behind this differential heating variable stretch process is that plastic sheeting has a "loss of memory" property that is directly proportional to the amount of heat applied to the plastic during stretching, within certain limits, and therefore the plastic that is heated to the higher temperatures during stretching will have less tendency to return to its unstressed original condition than the plastic that is not raised to the higher temperatures. By controlling the temperature of the heat applied to the plastic sheet across the width of the sheet a maximum stretch set can be obtained at one edge portion, see edge 21d in FIG. 5, and a minimum stretch set can be obtained at the other edge portion, see edge 21c of FIG. 5, so that the plastic section 21a assumes an arcuate shape as indicated by the numeral 13 in FIG. 5 when the process is completed. The cooling chamber 34 is primarily intended to cool the plastic to prevent sticking when it is passed through the tension rolls 41.

The manner of controlling the temperatures across the width of the sheeting 21, during stretch thereof, can assume several different forms. A preferred form is shown in FIGS. 3 and 4 wherein a dielectric type of heating unit 54 is included in the heating chamber 34. The dielectric unit 54 comprises a plurality of separately controlled rod or strip-like, dielectric heating units 55 each of which has a separate manually adjustable control 56. A sensing head type of automatic heat control unit 57, which is not a part of this invention, is positioned adjacent the outlet end of the heating chamber 30 to keep accurate control of the heat being applied at different positions across the width of the plastic sheeting 21 as it passes through the chamber 30. With the type of heat control schematically illustrated, it is thought to be obvious that it will be easy to set and control the degree of permanent stretch and the degree of recovery of the plastic sheeting 21 during its passage through the disclosed apparatus for shaping the banded plastic sheeting 21 into the accurate banded sections 13 that are adapted for laminated windshield interlayers.

FIG. 6 is an enlarged view of one of the electrode units 55 used in the dielectric heating unit 54. As can be seen from FIG. 6 the electrodes 55 are of wave-like configuration and are positioned on opposite sides of the sheeting 21. The electrodes 55 may be of a metallic composition with their peak portions 55a, on the sides adjacent the sheeting 21, coated with some suitable bearing material that will act as a good electric wave conductor while also serving as a protection against abrasion of the sheeting 21 as it passes between the peak portions of the electrodes 55. In some instances it may be that the sheeting 21 will actually slide along the peak portions 55a rather than be spaced slightly therefrom as shown in FIG. 6.

After the plastic sheeting 21 has passed from the tensioning rolls 41 it is moved on to an inspection table 43 and then to a cutting table 44. The arcuate segments 13 are severed from the sheeting 21 at this time and stored until they are needed for subsequent laminating operations. It has been found that almost immediately after passage through the tensioning rolls 41 the stretched plastic sheeting begins to contract and the degree of contraction is inversely related to the temperatures to which the plastic was subjected during the stretching process.

While cooling of the plastic sheeting 21 has been utilized to prevent sticking of the heated plastic sheeting to the tensioning rolls 41, still, it is possible to coat the rolls 41 with a suitable material so that the cooler 34 can be eliminated.

FIGURES 7 and 8 show a modified form of this invention wherein an infrared lamp heat unit 60 is utilized to provide the plastic heating unit in place of the dielectric heating units 55, 55 shown in the form of the invention disclosed in FIGURES 3 through 6. In FIGURES 7 and 8 the plastic sheeting 21 leaves the chiller room 23 and passes over guide rollers 22 and 26 to the reaction rolls 27. These reaction rolls 27 may be spring loaded and are adapted to be driven at a predetermined rate which may be adjustable. From the reaction rolls 27 the plastic sheeting 21 passes between opposed banks of infrared lamps 61 and 62 respectively which rows of lamps are provided with individual controls 63 and 64 respectively. A recirculating air supply system 68 may be connected to the interior of the case 65 for the infrared lamp units 61, 62. The reference numeral 66 shows the inlet duct and the reference numeral 67 shows the outlet duct of the system 68. Adjacent the lower end of the lamp bank case 65 is a temperature pick-up device or sensing unit 68' which is used to automatically check and control the heat applied across the width of the plastic sheet 21 as it passes through the infrared heat unit 60.

After passage of the plastic sheeting through the heat unit 60, the sheeting passes over guide rollers 69 and 70 and thence through a cooler unit 71 that may consist of a refrigeration unit 72 having outlet ducting 73 that discharges cool air across the vinyl sheeting after which the circulating cool air is returned to the refrigeration unit 72 by way of the return ducting 74. The banded plastic sheeting 21 leaving the refrigeration unit 71 is passed over guide rollers 76 to spring pressed tensioning rollers 77 which are driven at a different and faster speed than the reaction rolls 27. Preferably the speeds of the tensioning rolls may be adjusted in order to adapt the machine for stretching of different type plastics to different degrees. After passage of the heated, stretched plastic through the tensioning rolls 77 the plastic sheeting is deposited on an inspection table 43 and then transferred to the cutting table 44 where windshield segments 13 of the stretched, banded plastic sheeting are cut off and stacked for subsequent use. As was the case with the form of the invention shown in FIGURES 3 through 6, the banded plastic sheeting 21 will be stretched into an arcuate form due to the application of variable rate heating across the width of the sheeting at the time it is being stretched between the reaction rolls 27 and the tensioning rolls 77. The tensioning rolls 77 may include an inclination adjusting means with a cooperating sensing unit, similar to unit 51 in FIGURES 3–6, to compensate for any tendencies of the plastic to misalign due to the greater tension on one edge of the vinyl than on the other edge. This difference in tension on the opposite edges is due to the differential heating effect of the banks of infrared lamps 61, 62 on the plastic.

While but two forms of heating units have been shown, still, it is thought to be clear that other types of heating units may be substituted for the specific heating units shown without avoiding the scope of the invention as set forth in the appended claims. Also, while varying the intensity of the heat applied to the stretched plastic at different locations across the width of the plastic has effected variable elongation of the plastic, it may also be possible to achieve this same effect by varying the time of heat application across the width of the sheet.

I claim:

1. In a method of preparing a quadrilateral sheet of elastic plastic having a color band extending along one longitudinal edge thereof for use as a laminate interlayer between a pair of bent glass panels; the steps of stretching said plastic sheet equally in a longitudinal direction while applying heat to the stretched plastic sheet in a manner whereby certain longitudinally extending sections of the stretched plastic sheet are heated to a greater degree than other of said sections to cause the more highly heated of said stretched sections to have the elasticity thereof impaired and to take more of an elongated permanent set than other sections when the stretching of the plastic sheet is discontinued.

2. In a method of preparing a quadrilateral sheet of elastic plastic having a color band extending along one longitudinal edge thereof for use as a laminate interlayer between a pair of bent glass panels; the steps of stretching said plastic sheet equally in a longitudinal direction while applying heat to the stretched plastic sheet in a manner whereby certain longitudinally extending sections of the stretched plastic sheet are heated to a greater degree than other of said sections to cause the more highly heated of said stretched sections to have the elasticity thereof impaired and to take more of an elongated permanent set than other sections when the stretching of the plastic sheet is discontinued, the heat applied to the banded section of the sheet during the stretching thereof being of lesser intensity than the heat applied to the other sections of the sheet.

3. In a method of preparing a quadrilateral sheet of plastic having a color band extending along one longitudinal edge thereof for use as a laminate interlayer between a pair of bent glass panels; the steps of stretching said plastic sheet equally in a longitudinal direction while applying heat to the stretched plastic sheet in a manner whereby certain longitudinally extending sections of the stretched plastic sheet are heated to a greater degree than other of said sections to cause the more highly heated of said stretched sections to take more of an elongated permanent set than other sections when the stretching of the plastic sheet is discontinued, the heat applied to the banded section of the sheet during the stretching thereof being of lesser intensity than the heat applied to the other sections of the sheet, and the intensity of the heat applied to the stretched plastic sheet being such that it varies across the width of the sheet from a minimum adjacent the banded longitudinal edge to a maximum at the opposite longitudinal edge.

4. In a continuous method of preparing sections of plastic sheeting having a color band adjacent one longitudinally extending edge for laminate application to a bent glass panel; the steps of passing quadrilateral sections of a strip of banded sheeting into a stretching framework and equally stretching the sections of plastic in a longitudinal direction, applying heat to the equally stretched plastic while it is held in said framework with the intensity of the heat applied to plastic varying in degree across the width of the sheet with the minimum heat intensity being applied to the banded portion of the plastic section, releasing the stretched, heated sections of plastic from the stretching framework, and thereafter cutting sections of the stretched plastic from said strip.

5. In a continuous method of preparing sections of plastic sheeting having a color band adjacent one longitudinally extending edge for laminate application to a bent glass panel; the steps of passing quadrilateral sections of a strip of banded sheeting into a stretching framework and equally stretching the sections of plastic in a longitudinal direction, applying heat to the equally stretched plastic while it is held in said framework with the intensity of the heat applied to plastic varying in degree across the width of the sheet with the minimum heat intensity being applied to the banded portion of the plastic section, releasing the stretched, heated, sections of plastic from the stretching framework, and thereafter cutting sections of the stretched plastic from said strip, the intensity of the heat applied to the banded section of the plastic being such that the banded section takes a minimum permanent set when it is released from the stretching framework.

6. In a continuous method of preparing sections of plastic sheeting having a color band adjacent one longitudinally extending edge for laminate application to a bent glass panel; the steps of passing quadrilateral sections of a strip of banded sheeting into a stretching framework and equally stretching the sections of plastic in a longitudinal direction, applying heat to the equally stretched plastic while it is held in said framework with the intensity of the heat applied to plastic varying in degree across the width of the sheet with the minimum heat intensity being applied to the banded portion of the plastic section, cooling the stretched plastic section after a predetermined heat application, releasing the stretched, heated, sections of plastic from the stretching framework, and thereafter cutting sections of the stretched plastic from said strip, the intensity of the heat applied to the banded section of the plastic being such that the banded section takes a minimum permanent set when it is released from the stretching framework.

7. In a method of shaping a sheet of elastic plastic, the steps of mounting the sheet of plastic in a stretching frame, stretching said plastic sheeting in one direction at a rate that is substantially constant across the sheet in the direction normal to said one direction, applying heat below the melting point of the plastic to the stretched sheet in a manner wherein the intensity of the applied heat varies at different points across the sheet such that certain sections of said stretched sheet will be heated to such a degree as to cause the elasticity thereof to be impaired whereby said certain sections take a permanent elongated set when the sheet is released from the stretching frame.

8. In a method of shaping a sheet of elastic plastic, the steps of mounting the sheet of plastic in a stretching frame, stretching said plastic sheeting in one direction at a rate that is substantially constant across the sheet in the direction normal to said one direction, applying heat below the melting point of the plastic to the stretched sheet in a manner wherein the intensity of the applied heat varies at different points across the sheet such that certain sections of said stretched sheet will be heated to such a degree as to cause the elasticity thereof to be impaired whereby said certain sections take a permanent elongated set when the sheet is released from the stretching frame and cutting sections from said sheet after release thereof from the stretching frame.

9. In a continuous method of shaping sections of an elastic plastic strip having a color band arranged adjacent one of its longitudinally extending edges, the steps of passing a length of said banded strip of plastic between spaced pairs of rolls that uniformly stretch the portions of the strip between the rolls in a longitudinal direction during passage between the spaced rolls, applying heat below the melting point of the plastic to the stretched portions of the plastic strip located between the rolls as it is being stretched with the intensity of the heat applied to the stretched plastic varying across the width of the strip and being of such a degree that at least certain longitudinally extending portions of the strip have the elasticity thereof impaired and take a permanent set after release of the strip from the stretching rolls while other portions recover at least a portion of their elongation.

10. In a continuous method of shaping sections of a plastic strip having a color band arranged adjacent one of its longitudinally extending edges, the steps of passing a length of said banded strip of plastic between spaced pairs of rolls that uniformly stretch the portions of the strip between the rolls in a longitudinal direction during passage between the spaced rolls, applying heat to the stretched portions of the plastic strip located between the rolls as it is being stretched with the intensity of the heat applied to the stretched plastic varying across the width of the strip and being of such a degree that at least certain longitudinally extending portions of the strip take a permanent set after release of the strip from the stretching rolls, the intensity of the heat applied to said banded strip being least in the region adjacent the band and progressively increasing towards the opposite longitudinal edge.

11. In a continuous method of shaping sections of an elastic plastic strip, the steps of passing a length of said strip of plastic between spaced pairs of rolls that uniformly stretch the portions of the strip between the rolls in a longitudinal direction during passage between the spaced rolls, applying heat below the melting point of the plastic to the stretched portions of the plastic strip located between the rolls as it is being stretched with the intensity of the heat applied to the stretched plastic varying across the width of the strip and being of such a degree that at least certain longitudinally extending portions of the strip have the elasticity thereof impaired and take a permanent set after release of the strip from the stretching rolls while other portions recover at least a portion of their elongation.

References Cited in the file of this patent

UNITED STATES PATENTS

| | | |
|---|---|---|
| 2,344,511 | Harder | Mar. 21, 1944 |
| 2,708,813 | Bourgeaux | May 24, 1955 |
| 2,728,941 | Alles et al. | Jan. 3, 1956 |
| 2,817,117 | Shields et al. | Dec. 24, 1957 |
| 2,854,697 | Ryan | Oct. 7, 1958 |
| 2,856,634 | Ames | Oct. 21, 1958 |
| 2,873,474 | Shields et al. | Feb. 17, 1959 |
| 2,918,696 | Bottoms et al. | Dec. 29, 1959 |

FOREIGN PATENTS

| | | |
|---|---|---|
| 538,002 | Belgium | May 31, 1955 |
| 761,075 | Great Britain | Nov. 7, 1956 |